April 7, 1970  G. WEIGELE ET AL  3,504,394
APPARATUS FOR DRYING OF WASHED VEHICLES, PARTICULARLY
PASSENGER VEHICLES
Filed July 21, 1967  3 Sheets-Sheet 2
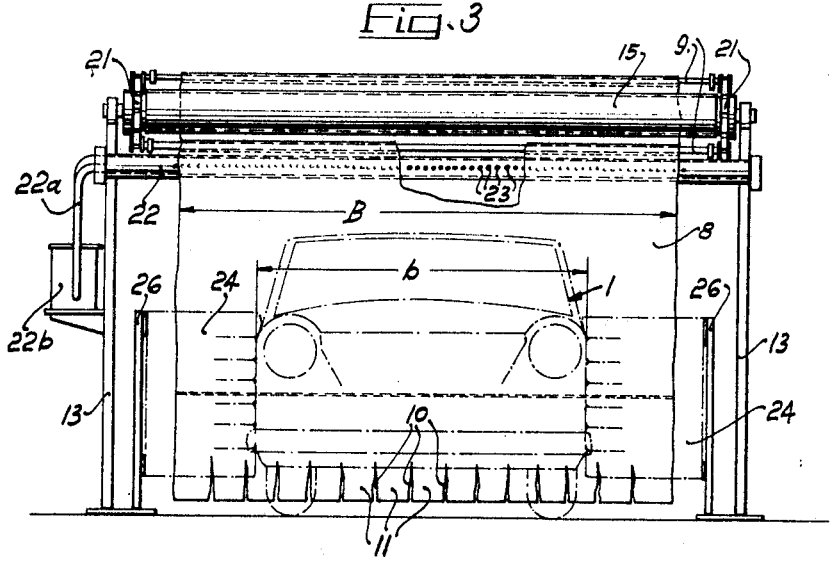
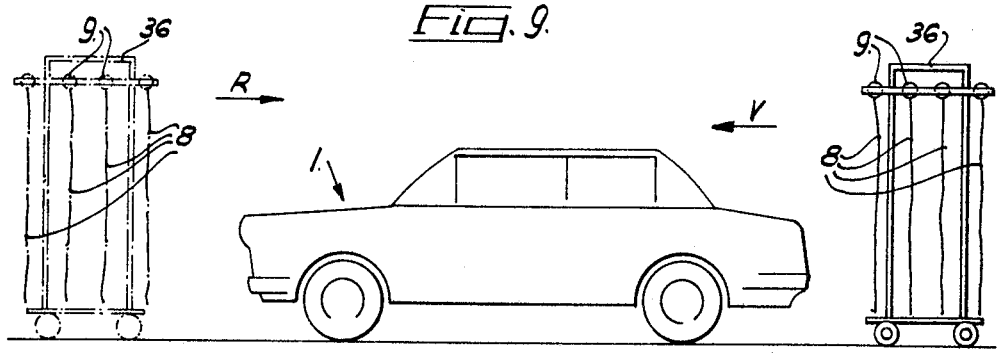
INVENTORS
GEBHARD WEIGELE
JOHANN SULZBERGER
BY
Woodhams, Blanchard and Flynn
ATTORNEYS April 7, 1970   G. WEIGELE ET AL   3,504,394
APPARATUS FOR DRYING OF WASHED VEHICLES, PARTICULARLY
PASSENGER VEHICLES
Filed July 21, 1967   3 Sheets-Sheet 3
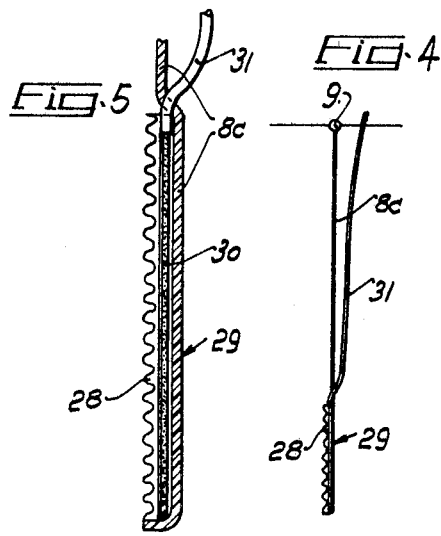
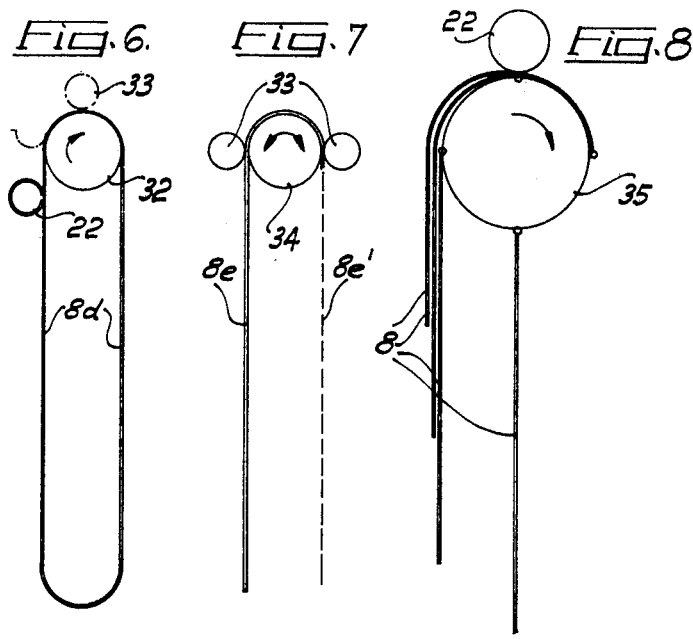
INVENTORS
GEBHARD WEIGELE
JOHANN SULZBERGER
BY
ATTORNEYS United States Patent Office 3,504,394
Patented Apr. 7, 1970

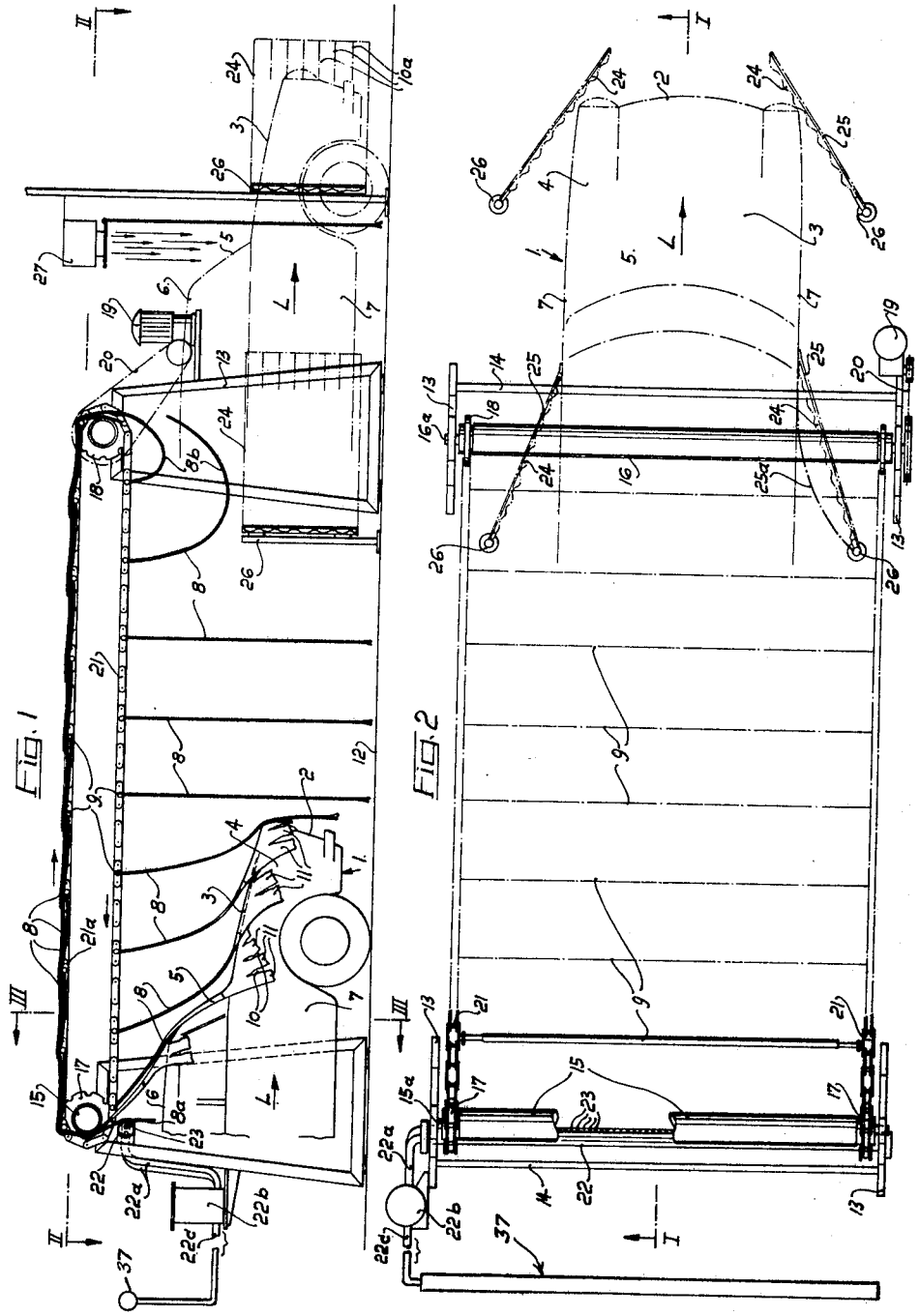

3,504,394
APPARATUS FOR DRYING OF WASHED VEHICLES, PARTICULARLY PASSENGER VEHICLES
Gebhard Weigele, Bussardweg 2, Augsburg, Germany, and Johann Sulzberger, Mozartstr. 17, Steppach, near Augsburg, Germany
Filed July 21, 1967, Ser. No. 655,084
Claims priority, application Germany, May 31, 1967, W 44,085
Int. Cl. B60s 3/06
U.S. Cl. 15—302                2 Claims

ABSTRACT OF THE DISCLOSURE

Apparatus for drying vehicles, which apparatus comprises a plurality of absorbent cloths which hang down into the path of movement of the vehicle. The cloths are hung from transverse rods which are fixedly connected to a pair of parallel endless chains positioned over the vehicle. Movement of the chains causes the cloth to be pulled over the vehicle so as to wipe the moisture therefrom. As the cloths approach one of the chain sprocket, they are pulled upwardly past a suction device whereby the moisture is removed from the cloth. The cloths are then carried back to the other end of the device whereby they fall downwardly so as to again hang in the path of movement of the vehicle for further drying action. Similar drying cloths are positioned adjacent the side of the vehicle for removing moisture therefrom.

This invention relates to an apparatus for drying of washed vehicles, particularly passenger vehicles, where a relative longitudinal movement exists between the vehicle and the drying apparatus.

The known devices of this type dry the washed vehicles in a way that the water on the vehicle is blown off or distributed and dried on the surface by means of strong air streams which are directed against the vehicle. Said known drying devices do not meet the requirements of practice because they are expensive due to the large amount of energy required. Further, these devices as a rule cannot obtain an even, complete and spotless drying. If completely clean and spotless surfaces are desired, a drying by hand with a damp chamois skin is required after the use of said drying apparatus.

The basic purpose of this invention is to manufacture a drying apparatus which allows a satisfactory drying of washed vehicles, particularly passenger vehicles, and which is inexpensive.

The basic idea of the invention is to bring the outer sides of the vehicle at all times into contact with absorbent material during the relative longitudinal movement between the vehicle and the drying apparatus to thus take off the dampness. Accordingly, the drying apparatus of the invention is characterized by absorbent, damp webs of cloth in an arrangement in which said webs wipe over the outer sides of the vehicle. The liquid absorbed by said webs of cloth during the drying operation can, by means of a simple device, be extracted from said webs of cloth. However, said device is not necessarily required in countries having a hot and dry climate.

Said new drying apparatus has important advantages: It results in a satisfactory drying in a way that the wetness is absorbed from the car surface directly by means of the capillary effect by the webs of cloth. An even, sparkling and spotless surface is obtained which in the past has been achieved only by wiping off the car with a chamois. The webs of cloth used in this invention make possible an automatic adjustment of the drying apparatus to any size and shape of the vehicle. Furthermore, the energy which is used by the drying apparatus is very low in view of the fact that only little force is required to pull the webs of cloth over the vehicle and extract the absorbed water from the webs of cloth.

Details of the invention are discussed more in detail hereinafter with reference to the embodiments illustrated in the drawings; wherein FIGURE 1 is a side elevational view along the line I—I of FIGURE 2 of a drying apparatus with a vehicle moving therethrough;

FIGURE 2 is a top view along the line II—II of FIGURE 1;

FIGURE 3 is a front view along the line III—III of FIGURE 1;

FIGURE 4 is a side-elevational view of a modified embodiment of a web cloth;

FIGURE 5 is a vertical section on an enlarged scale of the lower part of said web of cloth;

FIGURES 6 to 8 are further arrangements of webs of cloth;

FIGURE 9 is a back and forth movable drying apparatus for a parked vehicle.

The drawing illustrates a washed vehicle at 1 which is illustrated in full lines when driving into the drying device and in wash-dotted lines when driving out of the drying device. Absorbent, damp webs of cloth 8 are arranged in the path of the motor vehicle which is moved in longitudinal direction L. Said webs of cloth are made of water-absorbing material, advantageously of sponge cloth.

The embodiments illustrated in FIGURES 1 to 3 and 9 comprises a plurality of webs of cloth 8 which are arranged hanging and spaced from each other one behind the other in planes perpendicular to the longitudinal movement L, said webs of cloth being fastened to transverse rods 9 suspended at a height which is higher than the height of the vehicle. Said webs 8 as illustrated in FIGURE 1 advantageously extend close to the ground 11 and furthermore as illustrated in FIGURE 3 have a width B which is considerably wider than the width b of the vehicle. Still a further advantage is that the lower part of each web of cloth 8 is divided by vertical cuts 10 into a plurality of flaps 11. Said division results in a good adaptation of the webs of cloth to the shape of the vehicle as illustrated in FIGURE 1.

Upon movement of the vehicle in direction L, each one of the webs of cloth 8 operate one after the other by being pulled first over the front 2, then over the motor hood 3 and the fender 4, over the windshield 5, over the top 6 and finally over the back of the vehicle. Since the webs of cloth have a width which is considerably wider than the width of the vehicle, the side portions of said webs or their side flaps 11, as illustrated in FIGURE 1, partially wipe the sides 4 of the fenders or the sides 7 of the vehicle.

The embodiments illustraetd in FIGURES 1 to 3 and 6 to 8 furthermore comprise a device which pulls each web of cloth up to the area of a device which extracts the absorbed fluid from said web of cloth. Two driven, endless transfer chains 21 are provided for this purpose as illustrated in FIGURES 1 to 3, which chains are arranged in vertical planes in the direction of the longitudinal movement L and are connected by a plurality of horizontal transverse rods 9 which are used to hang up the webs of cloth 8. The transfer chains are guided over the chain wheels 17 and 78 whereby said chain wheels 18 are driven by an electric motor 19 through a chain drive 20. The opposed chain wheels 17 and 18 are each advantageously fixedly connected to pipes 15 and 16 which are used as shafts and at the same time to guide the webs of cloth 8 as illustrated in the drawing. Said shafts 15, 16 with the pivots 15a, 16a are mounted in side portions 13 of a frame whereby said side portions are connected by diagonal trussings.

To extract the liquid absorbed by the webs of cloth 8, FIGURES 1 to 3 advantageously provide above the height of the vehicle a suction pipe 22 having suction nozzles 23 arranged in a way that the web of cloth pulled up by the chains 21 passes by the suction nozzles. Since according to FIGURE 1 said suction pipe 22 is arranged below the pipe shaft 15, each web of cloth pulled up by the transfer chains 21, as indicated at 8a, abuts the suction pipe 22 in the area of the suction nozzles 23 so that only a relatively small suction is required to pull the excess dampness out of the webs of cloth. Said webs pulled up by the transfer chains over the pipe shaft 15 rest on the upper strand of the chains 21a in a horizontal position on the transverse rods 9 and fall down at the end of the drying device over the pipe shaft 16 as indicated by the webs of cloth 8b.

In order to obtain completely dry sidewalls 7 on the vehicle, absorbing webs of cloth 24 are (FIGURES 1 to 3) movably arranged on both sides of the drying device in a way that said webs of cloth during the relative longitudinal movement L are pressed against the sidewalls 7. The carriers 25 are pivotably mounted on a vertical axis and are pressed against the sidewalls 7 by spring force or the like. Said carriers can thereby be made of resilient material so that they are pressed during said pressing operation as indicated at 25a against said sidewalls 7 in a way that the absorbing webs of cloth 24 abut the sidewalls with larger areas. In order to obtain a still better adaptation of said webs of cloth to the shape of the sidewalls 7, said webs of cloth or also said carriers 25 can be divided by horizontal slits 10a into individual flaps.

As illustrated at 27 in FIGURE 1, the above-described drying apparatus can be followed by a device for blowing air in the direction indicated by the arrows, which air removes the distributed dampness possibly still left on the vehicle.

Aside from the above-described web arrangement, other arrangements are also possible as schematically illustrated in FIGURES 6 to 8. According to FIGURE 6 an endless web of cloth 8d is provided which is suspended on a driven roller 32. Said web of cloth 8d is pulled past a suction pipe 22 by means of said roller, which suction pipe extracts the excess liquid from the web by means of suction nozzles. Other suitable means can also be used for removing the liquid from the web of cloth, for example crushing cylinders as indicated at 33 in FIGURES 6 and 7. In the embodiment of FIGURE 7 there is provided a web of cloth 8e wrapped around the driven roller 34, said web of cloth being pulled upwardly upon rotation of the roller 34, being drained by the crushing cylinder 33 and thereby at the same time being brought to the other opening position 8e'.

The embodiment of FIGURE 8 illustrates a roller 35 of a larger diameter, said roller comprising several webs of cloth 8 hanging on its periphery. Upon rotation of the roller 35 the webs of cloth are pulled up one after the other and thereby have the water extracted therefrom. A suction pipe 22 having suction nozzles, a crushing cylinder or the like can be provided for this purpose.

FIGURE 4 finally illustrates schematically a further embodiment and arrangement of a web of cloth 8c suspended at 9, which web of cloth does not have to be pulled upwardly to extract same. In this case only the lower portion of the web of cloth consists of absorbing material 28 and forms a pocket 29 to which at least one suction pipe 31 is connected. To form said pocket, a foil 8c impermeable to air, for example plastic foil, may be used. A spacer 30, for example horsehair, kapok or the like, is provided between the absorbing material 28 and the foil 8c. The excess liquid is taken from said spacer by means of the suction pipe 31.

It is also illustrated in FIGURE 9 that a drying apparatus according to the invention can also be provided for a parked vehicle 1. Said drying apparatus comprises a driveable frame 36 which carries the absorbent webs of cloth 8 suspended on crossbars 9. In order to dry the washed vehicle 1, said drying apparatus is moved in longitudinal direction V into the position indicated in dash-dotted lines and from said position back in the direction R.

Experiments have shown that for drying the washed vehicle, webs of cloth of plastic are very suitable in view of the better tear and wear resistance. For this, artificial leather is advantageously used which has so far been used to clean window glass and the like.

The above-described drying apparatus of the invention can have blowing means 37 preconnected thereto, said blowing means blowing a part of the liquid from the vehicle. In this case, a large amount of liquid is removed from said vehicle by means of said known blowing means so that the web of cloth of the drying apparatus of the invention removes only the remaining liquid from said vehicle. Said preconnected blowing means can advantageously be fed by the pressure air of the suction device illustrated in FIGURES 1 to 3. The suction pipe 22 comprising the suction nozzles 23 is connected to a blower 22b by a suction pipe 22a, the compressed-air line 22c of said blower being in connection with the aforementioned blowing means.

The embodiments of the invention in which an exclusive property or privilege is claimed are defined as follows:

1. Apparatus for drying a surface of a motor vehicle, comprising:

a pair of horizontally spaced and aligned endless chain drive means supported a predetermined distance above the floor and above said motor vehicle, each of said chain drive means having an upper reach and a lower reach supported for movement longitudinally of said motor vehicle;

means driving said reaches of said endless chain drive means for movement longitudinally, of said motor vehicle;

a plurality of bars extending horizontally between said endless chain drive means and secured to said upper and lower reaches thereof at spaced intervals therealong and movable therewith;

liquid absorbing surface means secured to each of said bars and extending downwardly from at least said lower reaches thereof a sufficient length to engage all of the upper surfaces of said motor vehicle, said liquid absorbing surface means having a width at least greater than the width of said motor vehicle, thereby permitting said liquid absorbing surface means to engage the sidewall portions of said motor vehicle to absorb liquid therefrom to thereby dry same, said driving means effecting a longitudinal movement of said liquid absorbing surface means over the surface of a motor vehicle positioned therebeneath to absorb liquid therefrom to thereby dry same; and means located beneath said lower reach of said endless chain drive means adjacent one end thereof for removing liquid from said liquid absorbing surface means as said driving means effects a movement of said liquid absorbing surface means therepast, said means for removing liquid from said liquid absorbing surface means comprising a suction pipe having a plurality of suction nozzles therein, said suction nozzles being arranged in the longitudinal path of movement of the liquid absorbing surface means secured to the bars on the lower reaches of said endless chain drive means so that each of said liquid absorbing surface means will engage said liquid removing means, said driving means effecting a pulling of each of said liquid absorbing surface means over said suction pipe and said suction nozzles so that the liquid absorbed from the surface of said motor vehicle by said liquid absorbing surface means will be drawn into said suction nozzles and suction pipe to thereby dry said liquid absorbing surface means, whereby the liquid absorbed by said liquid absorbing surface means is appreciably removed before moving longitudinally over the surface of a motor vehicle.

2. Apparatus for drying a surface of a motor vehicle, comprising:

a pair of horizontally spaced and aligned endless chain drive means supported a predetermined distance above the floor and above said motor vehicle, each of said chain drive means having an upper reach and a lower reach supported for movement longitudinally of said motor vehicle;

means driving said reaches of said endless chain drive means for movement longitudinally of said motor vehicle;

a plurality of bars extending horizontally between said endless chain drive means and secured to said upper and lower reaches thereof at spaced intervals therealong and movable therewith;

liquid absorbing surface means secured to each of said bars and extending downwardly from at least said lower reaches thereof a sufficient length to engage all of the upper surfaces of said motor vehicle, said liquid absorbing surface means having a width at least greater than the width of said motor vehicle, thereby permitting said liquid absorbing surface means to engage the sidewall portions of said motor vehicle to absorb liquid therefrom to thereby dry same, said driving means effecting a longitudinal movement of said liquid absorbing surface means over the surface of a motor vehicle positioned therebeneath to absorb liquid therefrom to thereby dry same;

means located beneath said lower reach of said endless chain drive means adjacent one end thereof for removing liquid from said liquid absorbing surface means as said driving means effects a movement of said liquid absorbing surface means therepast, said means for removing liquid from said liquid absorbing surface means comprising a suction pipe having a plurality of suction nozzles therein and means for generating a positive and a negative air pressure, said negative air pressure of said pressure generating means being connected to said suction pipe to effect a removal of liquid from said liquid absorbing surface means as same is drawn over said suction nozzles of said suction pipe; and including blowing means preceding said drying apparatus and connected to said positive air pressure of said generating means, said blowing means being used to blow a part of the liquid from the surface of said motor vehicle, whereby the liquid absorbed by said liquid absorbing surface means is appreciably removed before moving longitudinally over the surface of a motor vehicle.

References Cited

UNITED STATES PATENTS

| 1,908,788 | 5/1933 | Pulliam | 15—97 |
| 2,142,711 | 1/1939 | Birch | 15—306.1 |
| 2,948,907 | 8/1960 | Schmidt | 15—97 |
| 3,089,168 | 5/1963 | Blandford | 15—97 X |

FOREIGN PATENTS

| 519,029 | 3/1955 | Italy. |
| 627,289 | 1/1963 | Belgium. |

ROBERT W. MICHELL, Primary Examiner

U.S. Cl. X.R.

15—97, 316